C. T. RAMSAY.
OPTICAL INSTRUMENT FOR USE IN PLAYING THE GAME OF GOLF OR LIKE BALL GAMES.
APPLICATION FILED FEB. 19, 1915.

1,135,921.

Patented Apr. 13, 1915.

Witnesses
Miriam Stern

Inventor
Charles T. Ramsay
By _____ Atty.

UNITED STATES PATENT OFFICE.

CHARLES THEOPHILUS RAMSAY, OF LIVERPOOL, ENGLAND.

OPTICAL INSTRUMENT FOR USE IN PLAYING THE GAME OF GOLF OR LIKE BALL GAMES.

1,135,921.     Specification of Letters Patent.     Patented Apr. 13, 1915.

Application filed February 19, 1915. Serial No. 9,384.

*To all whom it may concern:*

Be it known that I, CHARLES THEOPHILUS RAMSAY, R. N. R., M. I. N. A., a subject of the King of England, residing at 15 Sweeting street, Liverpool, in the county of Lancaster, England, have invented an Improved Optical Instrument for Use in Playing the Game of Golf or like Ball Games, of which the following is a specification.

This invention has for its object and effect to provide an optical instrument which can be worn over the eyes, by which in playing the game of golf or other similar ball game—or like purposes—the sight of the player is caused to be concentrated on the ball, and so that the fault of a golfer or other ball player, of not keeping his eye on the ball, to which many players are prone, is obviated.

This instrument, which may be in the form of a pair of pince-nez or spectacles, have a species of opaque "blinkers", with a relatively small aperture in them, through which, and through which alone, the wearer can see; and thus the distance in front, and behind a ball which the player has to strike, is so small, that he must see it definitely, and it compels him to "keep his eye on the ball." Hence as he cannot see the ball unless he is looking straight in front of him—not obliquely—as he is forced to look through the holes of the blinkers to see the ball, or see at all—except around and beyond the rim of the "blinkers"—he is obliged to look at it, and it enables him at once to know whether he is moving his head from the recognized proper position, or swaying his body.

The above form of instrument is illustrated in the accompanying drawings, in connection with which the invention will be further described.

Figure 1:
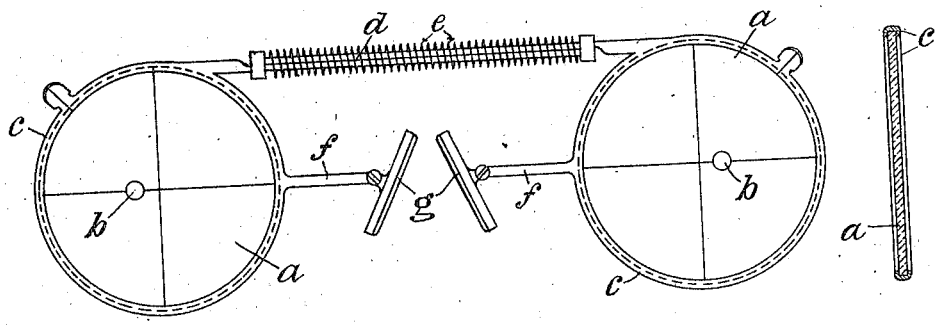
Figure 3:
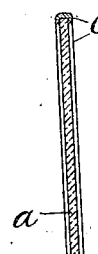
Figure 2:
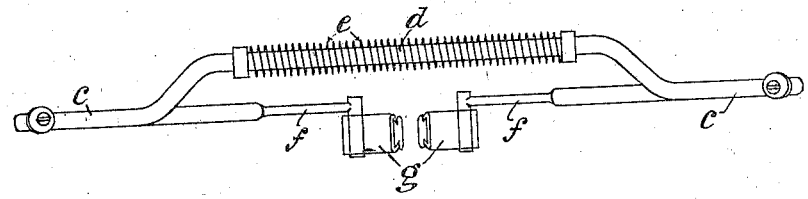

In the drawings Figure 1 is a front elevation; Fig. 2 is a plan; and Fig. 3 is a cross section of the instrument.

Referring to the drawings, *a* represents the opaque "blinkers", and *b* the relatively small hole or transparent area in each of them.

The blinkers *a* are supported in the circular frames *c*, and in which they are capable of being rotated, being truly circular; and these frames *c* are carried on a slidable bridge bar *d*, having a spring *e* on it, which presses them normally together in the manner of well known spring "pince-nez". The frames are also provided with projecting plaquette bars *f*, with hinged plaquettes *g* on the end of them, which grip the nose in the usual way of pince-nez.

The holes or transparent areas *b* which, as above stated, are relatively small, are eccentric in the blinker disks *a* so that by turning the disks around, these holes or areas can be adjusted to suit the different widths apart of the eyes of different users, and come into the desired position in front of the eyes. In the position shown in the drawings, the holes or areas *b* are in the same horizontal plane, as the axes of the blinkers.

The blinkers can be made of any suitable material, but in all cases they must be opaque, or sufficiently so for the purposes of the invention; and if of glass, the glass will have a "ground" surface, or be colored, or be covered with an opaque covering, with the exception of the holes or areas *b*, as the case may be.

In some cases, as a modification, an ordinary pair of spectacles or eye-glasses may have fitted over and attached to them, that is the frames, or the glasses themselves, as the case may be, may have fitted over them, a disk or other suitable shaped blinker device, with a hole or transparent area in each; and this hole or area may be in the center of the blinker, or eccentrically placed, in the manner and for the purposes described.

With regard to this apparatus as a whole, it constitutes a species of golfers' fault eradicator.

Most professional golfers admit that "moving the head" and "swaying the body" are fatal faults with the average golfer, generally committed unconsciously, but very difficult for him to detect; and it is primarily the object and effect of the present invention to provide means by which a golfer may be made to really know what he is doing wrong, and thus enable him to correct his errors, and improve his play; and this is accomplished by this invention. And if the blinker devices be capable of being turned around in their carriers, and have the holes or transparent areas in them eccentrically placed, the instrument can be adjusted to suit the sight, convenience, or requirements of any player by merely turning the disks; and when they are so adjusted in playing, the instrument indicates to the golfer whether he is "moving his head" or "swaying his body"; and by its use, the golfer is taught to keep his head still, better timing is brought about, and therefore increased length of drive.

The instrument is small and light, and can be easily carried in the pocket.

What is claimed is:—

An optical instrument for the purpose described, comprising a framework, circularly adjustable opaque disks carried thereby, each disk having in it a small hole or transparent area, disposed eccentrically in it or on it for the purpose described.

In testimony whereof I have signed my name to this specification in the presence of two subscribing witnesses.

CHARLES THEOPHILUS RAMSAY.

Witnesses:
S. COODALL,
F. E. FLEETWOOD.